United States Patent Office 3,436,389
Patented Apr. 1, 1969

3,436,389
STEROID-(17α,16α-d)OXAZOLINES AND METHOD FOR THEIR PREPARATION
Giangiacomo Nathansohn and Giorgio Winters, Milan, Italy, assignors to Lepetit S.p.A., Milan, Italy
No Drawing. Filed Mar. 30, 1966, Ser. No. 538,574
Claims priority, application Great Britain, Apr. 22, 1965, 17,027/65; Aug. 20, 1965, 35,865/65
Int. Cl. C07c *173/10, 169/34;* A61k *17/00*
U.S. Cl. 260—239.55                                3 Claims

ABSTRACT OF THE DISCLOSURE

Steroids having a high degree of gluco-corticoid and anti-inflammatory activity and of the formula

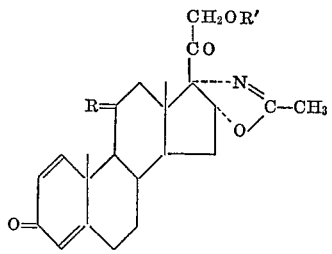

wherein R is O or H(β-OH), while R' is H or acyl, are produced by reacting steroid-oxazolines of the formula

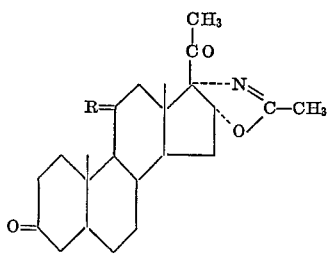

with 2 equimolecular amounts of bromine in dioxane, heating the obtained 2,4-dibromo derivative with a mixture of lithium bromide and carbonate, and subjecting the obtained 1,4-diene to 21-acyloxylation through the 21-iodo derivative.

This invention is concerned with new steroids and with the method for preparing them. More particularly the compounds with which this invention is concerned are steroid-[17α,16α-d]-oxazolines of the formula

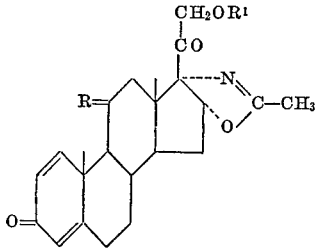

wherein
R=O, H(β-OH)
R¹=H, acyl

The process for the preparation of the novel compounds starts from steroid-oxazolines of the general formula

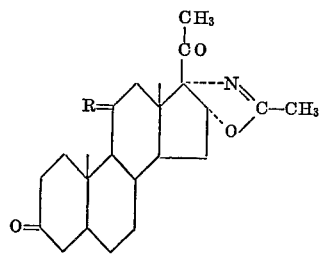

wherein R has the same significance as above. The steps of said process can be represented as follows:

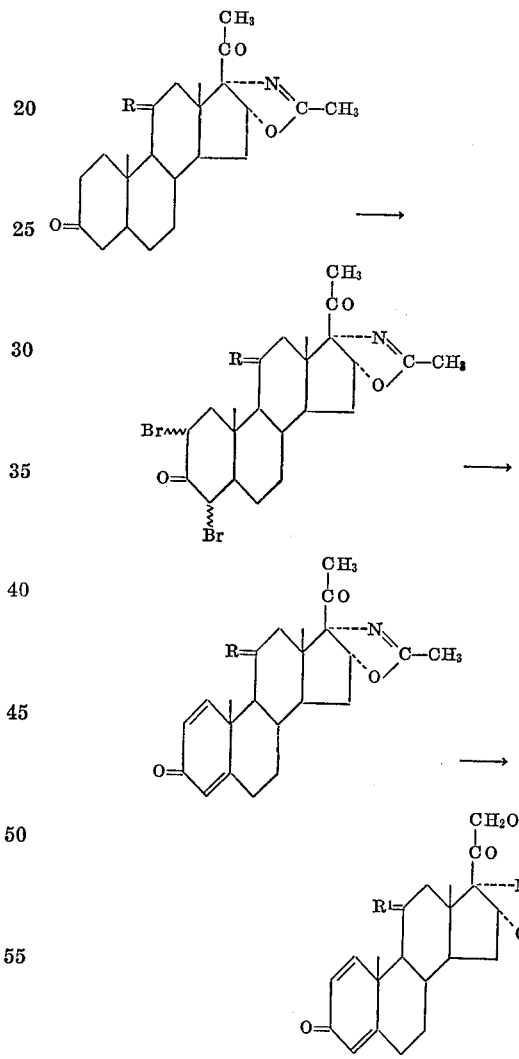

The process consists in subjecting the starting compound to the action of bromine, in a suitable solvent, subjecting the obtained 2,4-dibromoderivative to dehydrobromination and the formed 1,4-diene to acetoxylation in order to introduce an acetoxy group in position 21. The end compounds of this class have shown interesting pharmacological properties. For instance, some representatives of the class showed a high degree of gluco-corticoid activity. The following table gives a comparison of the steroid prepared according to Example 2 hereinbelow, with hydrocortisone, for the effect of glycogen deposition in liver of adrenectomized male rats, strain Wistar F., by subcutaneous treatment.

| Substance | Dose, γ/rat | No. of rats per dose | Liver glycogen±S.E. (mg. glucose/ 100 g. rat) |
|---|---|---|---|
| Controls | | 10 | 1.09±0.05 |
| Compound of Example 2 | 500 | 10 | 34.97±2.64 |
| | 2,000 | 10 | 51.50±2.09 |
| Hydrocortisone | 500 | 10 | 8.24±0.64 |
| | 2,000 | 10 | 23.07±2.95 |

On the other hand, an excellent anti-inflammatory activity is displayed by the steroids of the invention, as shown by the following table. The figures give the percent decrease of granuloma caused by subcutaneously implanted cotton pellets in adrenectomized male rats. The rats were treated orally every day for 6 days with the products dissolved or suspended in 10 percent gum arabic.

| Substance | Dose, mg./kg. | No. of rats | Average weight of granuloma, mg.±S.E. | Percent decrease in weight of granuloma |
|---|---|---|---|---|
| Controls | | 14 | 43.3±1.36 | |
| Compound of Ex. 2 | 0.5 | 7 | 23.1±1.48 | 46.7 |
| | 1.5 | 7 | 21.9±0.67 | 49.4 |
| | 4.5 | 7 | 19.1±0.86 | 55.9 |
| Prednisone | 1.0 | 7 | 41.1±1.55 | 5.1 |
| | 3.0 | 7 | 34.5±1.59 | 20.3 |
| | 9.0 | 7 | 27.1±1.38 | 37.4 |

The following nonlimitative examples illustrate the invention.

EXAMPLE 1

Preparation of pregna-1,4-diene-21-ol-3,11,20-trione-[17α,16α-d]-2′-methyloxazoline-21-acetate (a) A solution of 10 g. of 5α-pregnane-3β-ol-11,20-dione-[17α,16α-d]-2′-methyl-oxazoline [Nathansohn et al., "Gazzetta Chimica Italiana," vol. 95 (1965) page 1348] in 450 ml. of acetone is oxidized at room temperature with 8 N chromic acid. After dilution with 500 ml. of water, the acetone is evaporated in vacuo and the solution is made neutral with sodium hydroxide. The compound is extracted with chloroform, washed and the solution evaporated to dryness. There are obtained 8.7 g. of a compound which is crystallized from methylene chloride-hexane; M.P. 223–226° C.; [α]$_D$+127.1° (c. 0.5, CHCl$_3$). The product is 5α-pregnane-3,11,20-trione-[17α,16α-d]-2′-methyloxazoline.

(b) To a solution of 5 g. of the above product in 80 ml. of dioxane 9 ml. of a 32 percent solution of HBr in acetic acid, followed by a solution of 4.23 g. of Br$_2$ in 40 ml. of dioxane are added. After 20 minutes the solution is poured into 1000 ml. of ice-water containing 20 g. of potassium acetate, the product is extracted with ethyl acetate and the extract is evaporated in vacuo giving a residue of 7.0 g.; [α]$_D$+64.4° (c. 0.5, CHCl$_3$).

(c) A solution of 5.5 g. of the above product 5α-pregnane-2,4-dibromo-3,11,20-trione-[17α,16α,-d]-2′-methyloxazoline in 70 ml. of dimethylformamide is heated under a nitrogen stream and with stirring in the presence of 1.6 g. of Li$_2$CO$_3$ and 1.6 g. of LiBr for 4 hours at 140° C. The mixture is poured into 500 ml. of ice-water and extracted with ethyl acetate. The organic extract is washed with a saturated solution of NaCl and evaporated to dryness in vacuo. The residue is crystallized from ethyl acetate-hexane. The obtained pregna-1,4-diene-3,11,20-trione-[17α,16α-d]-2′-methyloxazoline has M.P. 230–231° C.; [α]$_D$+170.3° (c. 0.5, CHCl$_3$).

(d) A solution of 4.6 g. of pregna-1,4-diene-3,11,20-trione-[17α,16α-d]-2′-methyloxazoline in 70 ml. of tetrahydrofuran-methanol (1:1) is treated with 6.9 g. of calcium oxide and 2.3 g. of α,α′-azo-bis-isobutyronitrile. To this mixture a solution of 4.6 g. of iodine in 23 ml. of tetrahydrofuran and 13 ml. of methanol is gradually added at 10° C. under strong stirring. The mixture is then diluted with 70 ml. of CH$_2$Cl$_2$ and filtered. The filtrate is evaporated to dryness and gives about 6 g. of an oily product (21-iododerivative) which, dissolved in 25 ml. of acetone, is added to a mixture of 42 g. of triethylamine, 42 ml. of acetone and 25.4 ml. of acetic acid. The mixture is refluxed for 45 minutes, evaporated to a volume of about 40 ml., diluted with 200 ml. of H$_2$O and extracted with ethyl acetate. On evaporation 4.8 g. are collected; M.P. 174–175° C.; [α]$_D$+152° (c. 0.5, CHCl$_3$). The free 21-OH derivative is prepared by usual procedures.

EXAMPLE 2

Preparation of pregna-1,4-diene-11β,21-diol-3,20-dione-[17α,16α-d]-2′-methyloxazoline-21-acetate (a) A solution of 8.3 g. of semicarbazide hydrochloride and 5.75 ml. of pyridine in 50 ml. of water is continuously poured into a boiling solution of 10 g. of 5α-pregnane-3β-ol-11,20-dione-[17α,16α-d]-2′-methyloxazoline in methanol (350 ml.). Boiling is continued with stirring for 5 hours, then the solution is concentrated in vacuo to a pasty lump. By addition of 300 ml. of water the product separates and is collected and dried. Yield 11 g. (96%) of the 20-semicarbazone of the above compound.

(b) Nine grams of the above obtained semicarbazone are dissolved in 230 ml. of 95% ethanol. Under a nitrogen stream at 65° a solution of 3.6 g. of KHC$_3$ in water (36 ml.) is added, folowed by 2.34 g. of sodium borohydride in small amounts. The mixture is refluxed under stirring for 30 minutes, then a second portion of reducing agent (2.34 g.) is added. Heating is carried out for 90 minutes, then the mixture is cooled and made neutral by adding 5% acetic acid. About 200 ml. of the solvent are evaporated in vacuo, replacing them with water. The mixture is cooled and filtered giving a product which is collected and dried, and that weighs 8.5 g. (94%). The product is 5α-pregnane-3β,11β-diol-20-one-[17α,16α-d]-2′-methyloxazoline 20-semicarbazone.

(c) An amount of 7.7 g. of the above prepared product is refluxed in 154 ml. of a 1:1 mixture of methanol and 10% hydrochloric acid for 1 hour. The solution is filtered and the organic solvent is removed in vacuo from the filtrate. On making the mixture neutral with 10% NaOH a bulky precipitate is obtained, that is filtered and dried; yield 6 g. (95%), M.P. 245–250° C. of 5α-pregnane-3β,11β-diol-20-one-[17α,16α-d]-2′-methyloxazoline. An analytical sample melts at 255–258° C. From this compound the 3-acetate can be prepared by usual procedures. M.P. 238–240° C. (CH$_3$OH).

(d) An amount of 12.5 g. of 5α-pregnane-3β,11β-diol-20-one-[17α,16α-d]-2′-methyloxazoline, obtained as described immediately above, is dissolved in 500 ml. of anhydrous toluene and 90 ml. of cyclohexanone. To said solution of 6.24 g. of aluminum isopropoxide are added. The mixture is refluxed and stirred for 2 hours, then the solvent is completely removed by distillation. The residue is extracted with methanol; the product, obtained by evaporating methanol, is purified by column percolation, using silicagel and chloroform as eluting solvent. Yield 9 g. (75%) of 5α-pregnane-11β-ol-3,20-dione-[17α,16α-d]-2′-methyloxazoline, M.P. 196–200° C. [α]$_D$+108° (c. 0.5, CHCl$_3$).

(e) An amount of 6.5 g. of said diketone is dissolved in 123 ml. of anhydrous dioxane and treated with a 25% hydrogen bromide solution in CH$_3$COOH. About 5.5 g. of bromine in dioxane are added dropwise to said solution in 1 hour. The mixture is poured into 1 l. of cold water containing 35 g. of potassium acetate: a solid separates, which is collected, thoroughly dried and dissolved in dimethylformamide under nitrogen. Mixed LiBr and $Li_2CO_3$ (1:2) are added (7.5 g.) and the solution is strongly stirred and heated at 140° for 4 hours; then it is poured into cold water, which is extracted with ethyl acetate. The product obtained by distillation of the solvent is purified chromatographically using silicagel and benzene-chloroform-ethanol as the solvent. Yield 5.1 g. (80%) of 1,4-pregnadiene-11β-ol-3,20-dione-[17α,16α-d]-2′-methyloxazoline, M.P. 275–280° C., $\lambda_{max.}$ 240–242 mµ ($CH_3OH$); $E_{1\,cm.}^{1\%}$ 402

Two grams of the above compound are dissolved in tetrahydrofuran-methanol (1:1). To this solution powdered calcium oxide (3 g.) and α,α-azobisisobutyronitrile (0.1 g.) are added. Two grams of iodine dissolved in tetrahydrofuran-methanol are gradually added. The mixture is filtered and the filtrate is washed with cold sodium thiosulphate solution and water, then the solvent is evaporated in vacuo to dryness. The residue, dissolved in acetone, is added to 20 ml. of triethylamine, 20 ml. of acetone and 12 ml. of acetic acid and this solution is refluxed for 1 hour. Some water is added and the organic solvent is evaporated in vacuo. The residue is collected and chromatographically purified using silicagel and benzene-chloroform-ethanol as the solvent 49:49:2), thus obtaining the compound which may be recrystallized from acetone-hexane; yield 1.6 g. (70%), M.P. 256.5° C.

$\lambda_{max.}$ 241–243 mµ ($CH_3OH$), $E_{1\,cm.}^{1\%}$ 353

The free 21-OH derivative can be prepared by usual procedures.

We claim:
1. A compound of the formula

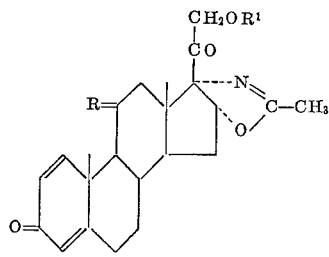

wherein R is a member of the class consisting of O and H(β-OH), $R^1$ is a member of the class consisting of hydrogen and lower aliphatic carboxylic acid acyl groups.
2. Pregna - 1,4 - diene-11β,21-diol-3,20-dione-[17α,16α-d]-2′-methyloxazoline.
3. Pregna - 1,4-diene-21-ol-3,11,20-trione-[17α,16α-d]-2′-methyloxazoline.

References Cited

UNITED STATES PATENTS

| | | | |
|---|---|---|---|
| 2,874,154 | 2/1959 | Stork et al. | 260—239.55 |
| 2,923,721 | 2/1960 | Joly et al. | 260—397.3 |

OTHER REFERENCES

Amiard et al., Bull. Soc. Chim., France [1965], 2321–2328 (pp. 2323 and 2327 relied on).

Winternitz et al., Steroids, December 1965, pp. 805–840; p. 811 pertinent.

LEWIS GOTTS, Primary Examiner.

E. G. LOVE, Assistant Examiner.

U.S. Cl. X.R.
424—241